United States Patent [19]

Abo et al.

[11] Patent Number: 4,533,340
[45] Date of Patent: Aug. 6, 1985

[54] HYDRAULIC CONTROL SYSTEM FOR CONTINUOUSLY VARIABLE V-BELT TRANSMISSION

[75] Inventors: Keiju Abo, Yokosuka; Sigeaki Yamamuro, Zushi; Yoshikazu Tanaka; Haruyoshi Kumura, both of Yokohama; Hiroyuki Hirano, Yokosuka, all of Japan

[73] Assignee: Nissan Motor Co., Ltd., Yokohama, Japan

[21] Appl. No.: 544,071

[22] Filed: Oct. 20, 1983

[30] Foreign Application Priority Data

Oct. 22, 1982 [JP] Japan .................. 57-184623

[51] Int. Cl.³ ............................................. F16H 11/04
[52] U.S. Cl. ............................................ 474/28; 474/18
[58] Field of Search ............... 474/28, 17, 18, 11, 474/12

[56] References Cited

U.S. PATENT DOCUMENTS 4,369,675  1/1983  Van Deursen ................. 474/28 X

FOREIGN PATENT DOCUMENTS

| 0027672 | 4/1981 | European Pat. Off. |
|---|---|---|
| 0061732 | 10/1982 | European Pat. Off. |
| 2703488 | 8/1977 | Fed. Rep. of Germany ........ 474/28 |
| 1045367 | 11/1953 | France . |
| 1069215 | 7/1954 | France . |
| 2065790 | 8/1971 | France . |
| 56-44747 | 3/1981 | Japan ..................... 474/28 |
| 1525674 | 9/1978 | United Kingdom . |

Primary Examiner—Stephen J. Novosad
Assistant Examiner—Thuy M. Bui
Attorney, Agent, or Firm—Schwartz, Jeffery, Schwaab, Mack, Blumenthal & Evans

[57] ABSTRACT

A hydraulic control system comprises a line pressure regulator valve which uses a spring has non-uniform spring rate. A spring is compressed between a pressure regulating element and a member movable responsive to a reduction ratio between drive and driven pulleys. A length of the spring is varied by the member with variation in the reduction ratio. The line pressure regulator valve generates a line pressure having non-linear characteristic with respect to the variation in the reduction ratio.

8 Claims, 9 Drawing Figures

HYDRAULIC CONTROL SYSTEM FOR CONTINUOUSLY VARIABLE V-BELT TRANSMISSION

CROSS REFERENCE TO RELATED APPLICATIONS

Reference are made to the copending U.S. patent applications as follows: U.S. patent application Ser. No. 362,488 filed Mar. 26, 1982; and U.S. patent application Ser. No. 489,600 filed Apr. 28, 1983. References are also made to the following related co-pending applications, each filed by the same applicants concurrently with the present application: U.S. patent application Ser. No. 543,838; U.S. patent application Ser. No. 543,834; U.S. patent application Ser. No. 544,066; and U.S. patent application Ser. No. 543,840.

BACKGROUND OF THE INVENTION

The present invention relates to a hydraulic control system for a continuously variable V-belt transmission.

A line pressure used in the continuously variable V-belt transmission should preferably be maintained at a minimum value required. If the line pressure is higher than this minimum value, the V-belt will be subject to a tension greater than necessary, shortening its life span and reducing its power transmission effeciency. Further, an oil pump has to discharge oil pressure higher than necessary, resulting in a loss of the pump.

Figure 3:
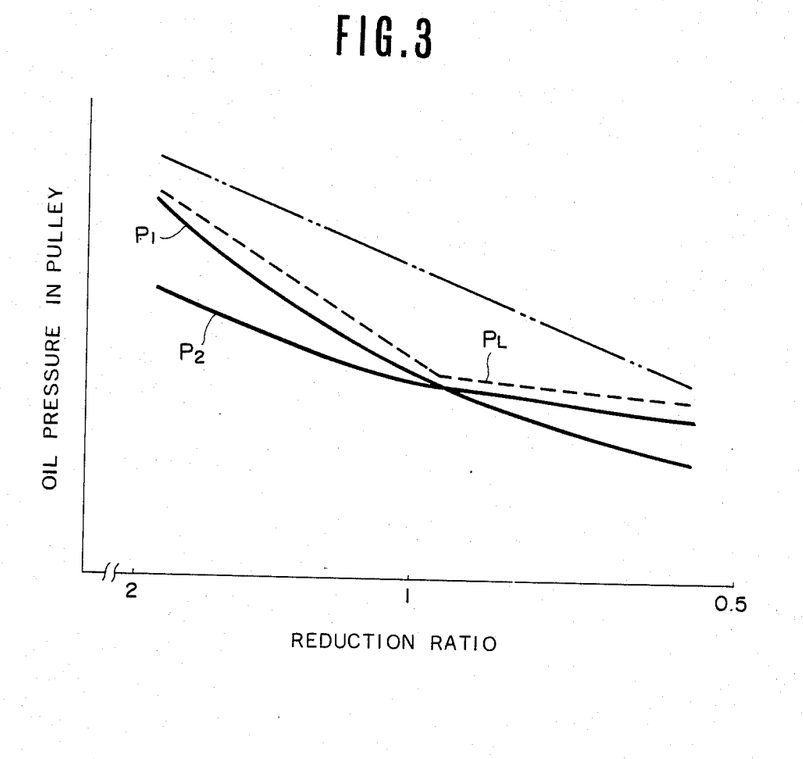
FIG. 3 is a graph showing a minimum oil pressure required by a drive pulley (fully drawn curve P1), a minimum required oil pressure required by a driven pulley (fully drawn curve P2), the previously proposed line pressure (phantom line) discussed before, and the desired line pressure (broken line) also discussed above.

Co-pending U.S. patent application Ser. No. 362,488, filed Mar. 26, 1982 discloses a hydraulic control system for a continuously variable V-belt transmission wherein a drive pulley has a larger pressure acting area therein than a pressure acting area in a driven pulley. A line pressure regulator valve used in this hydraulic control system generates a line pressure which varies linearly in proportion to an engine torque and also to a reduction ratio between the both pulleys. This line pressure approximates to the minimum value required over most of the operating range. But, it is still higher than necessary in certain operating range. Referring to FIG. 3, this will be further described. As shown by the fully drawn curves shown in FIG. 3; the minimum oil pressure P1 required by the drive pulley cylinder chamber is higher than the minimum oil pressure P2 required by the driven pulley cylinder chamber at reduction ratios larger than a certain reduction ratio near one and the former is lower than the latter at reduction ratios smaller than the certain reduction ratio. The line pressure according to the above co-pending U.S. application varies linearly as shown by the phantom line for the reduction ratio and thus becomes higher than necessary at reduction ratios near one. In order to provide the required minimum oil pressure over the whole reduction ratios, the line pressure must vary non-linearly as shown by the broken lines in FIG. 3.

SUMMARY OF THE INVENTION

According to the present invention, a hydraulic control system is provided with a line pressure regulator valve. The line pressure regulator valve comprises a pressure regulating element, a member movable responsive to a reduction ratio between drive and driven pulleys and a spring means acting between the pressure regulating element and the member. The member is movable relative to the pressure regulating element to vary a length of the spring means in response to the reduction ratio. The spring means biases the pressure regulating element with a force which varies at a different rate for variation in the length of the spring means. The pressure regulating element is movable in response to the force by the spring means and a line pressure.

Accordingly, an object of the present invention is to provide a hydraulic control system wherein a line pressure that varies non-linearly for variation in a reduction ratio between drive and driven pulleys and meets a minimum value required by the both pulleys over the whole reduction ratios.

DETAILED DESCRIPTION OF THE INVENTION

Figure 1:
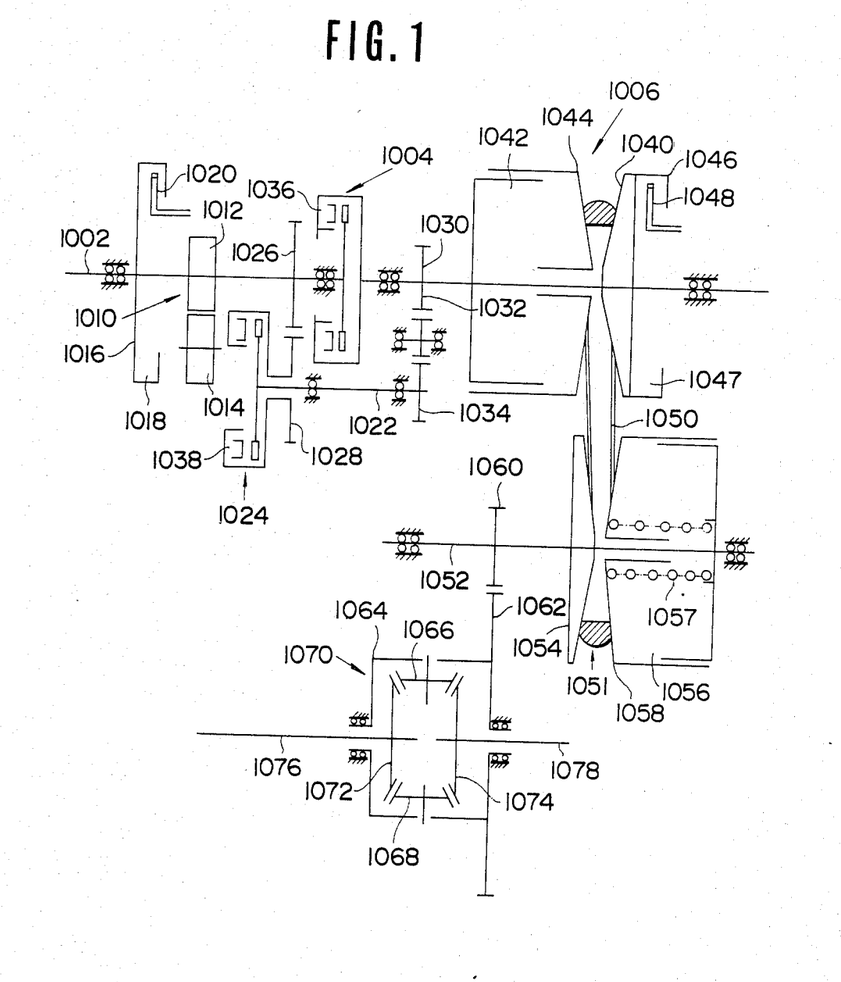
FIG. 1 is a diagrammatic view of a transmission mechanism of a continuously variable V-belt transmission.
Figure 2A:
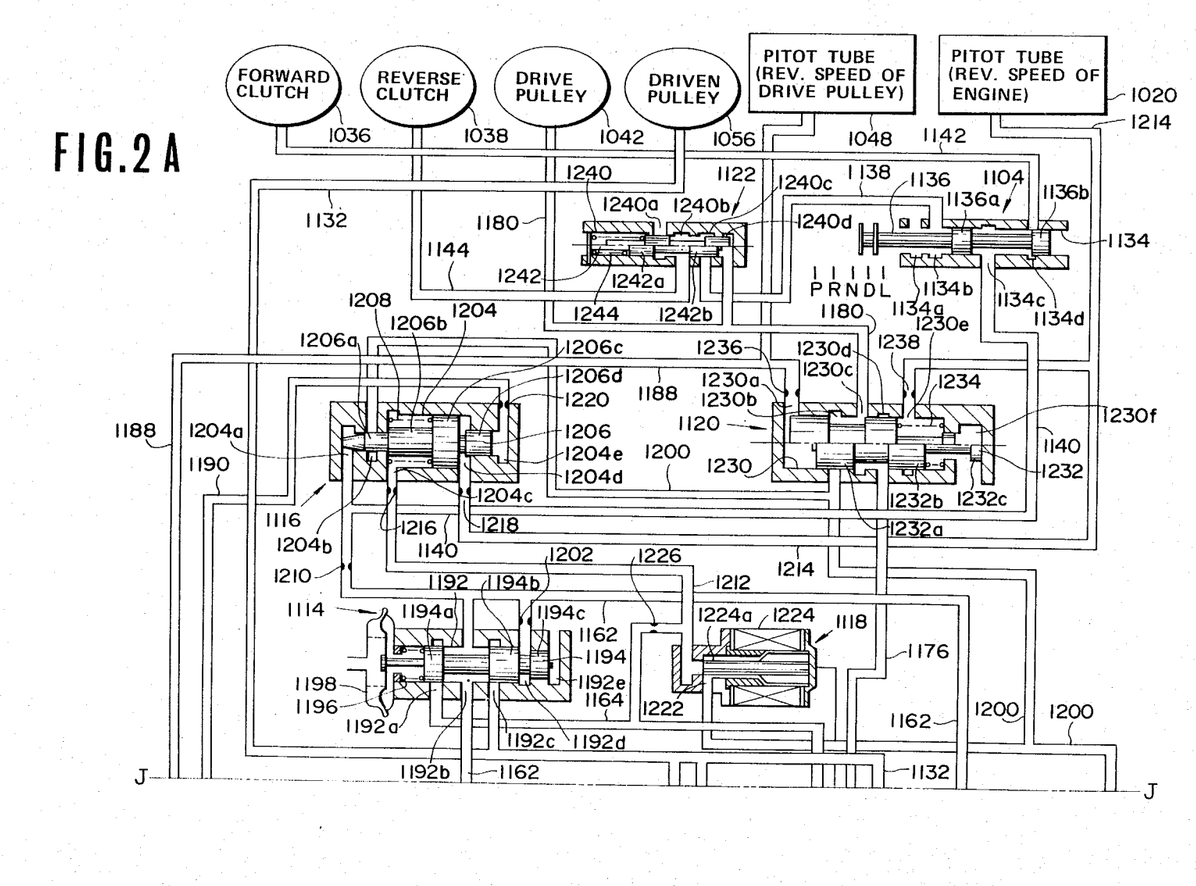
FIGS. 2A and 2B, when combined, illustrate a hydraulic control system for the continuously variable V-belt transmission according to the present invention.
Figure 2B:
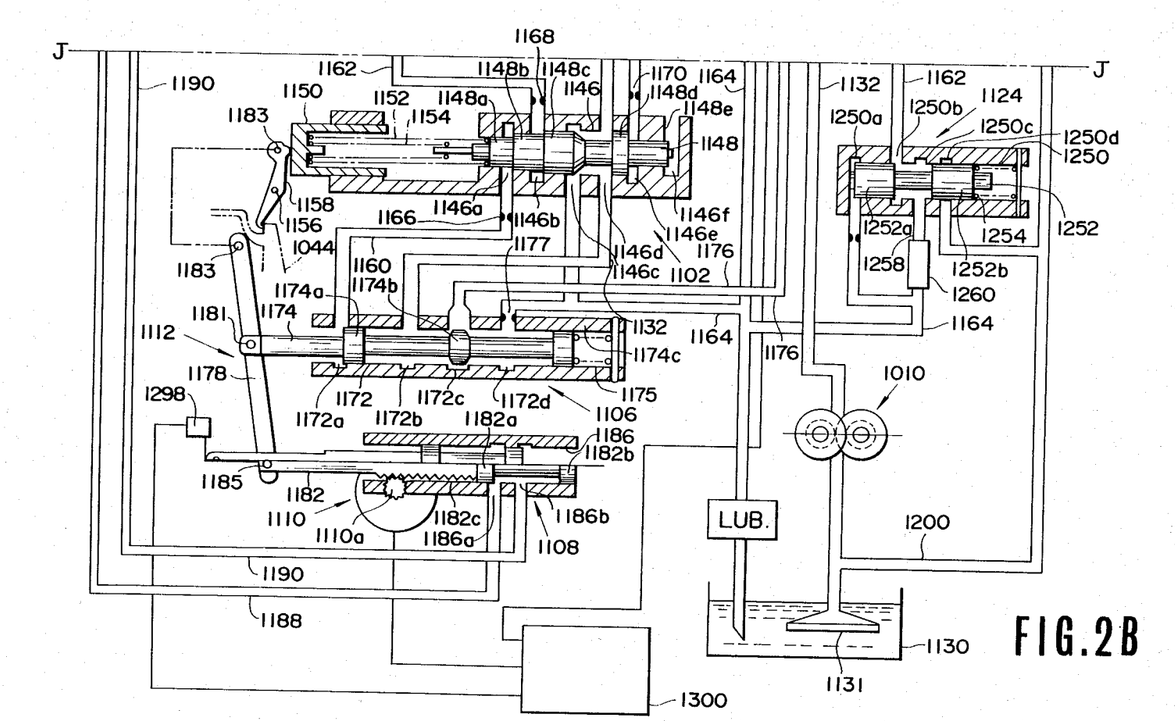

Referring to FIGS. 1, 2A and 2B, an embodiment according to the present invention is illustrated. This embodiment is described in co-pending U.S. patent application Ser. No. 489,600 filed Apr. 28, 1983 (see FIGS. 24, 25A and 25B) by the same applicants and commonly assigned herewith. That portion of the disclosure of this co-pending application which relates to FIGS. 24, 25A and 25B is hereby incorporated by reference in its entirety. Referring to FIGS. 2A and 2B, a stepper motor 1110 and a force motor 1224 are controlled by an electronic control unit 1300. The construction and operation of this electronic control unit 1300 in relation to the stepper motor 1110 and force motor 1224 are described in co-pending U.S. Pat. Appln. Ser. No. 543,838, entitled "CONTROL SYSTEM FOR HYDRAULIC AUTOMATIC CLUTCH", filed by the same applicants as those of the present application concurrently with the present application and claiming priorities on four Japanese patent applications Nos. 57-184627, 58-40808, 58-70095 and 58-92418. This co-pending application has been incorporated hereby by reference in its entirety. Particularly, attention is directed to the description along with FIGS. 3 through 21.

Hereinafter, the operation of the line pressure regulator valve 1102 shown in FIG. 2B is described in detail.

Before entering into the description of the operation of the line pressure regulator valve 1102, a consideration is made regarding the minimum oil pressure P1 required by the cylinder chamber 1042 of the drive pulley 1006 and the minimum oil pressure P2 required by the cylinder chamber 1056 of the driven pulley 1051 (see FIG. 1).

The minimum oil pressures P1 and P2 can be expressed by the following equations:

$$P1 = Q1/S1$$

$$P2 = Q2/S2$$

where:
P: Required oil pressure by pulley cylinder chamber
Q: Bias force by pulley
S: Effective pressure acting area of pulley cylinder
(In the above equation suffix 1 denotes a drive pulley side, while suffix 2 denotes a driven pulley side.)
The Q1 and Q2 will take the minimum values as expressed by the following equations which are high enough for preventing slip of the V-belt.

$$Q2 = (TE \cdot \cos \theta)/(2\mu \cdot r1)$$

$$Q1 = \frac{\phi 1}{\phi 2} \cdot Q2 + \frac{\phi 1 \cdot TE}{2r1 \cdot \tan(\theta + \rho n)}$$

$$\left[ 1 - \frac{1}{2}\left( \frac{\tanh(\lambda \cdot r1 \cdot \phi 1)}{\lambda \cdot r1 \cdot \phi 1} + \frac{\tanh(\lambda \cdot r2 \cdot \phi 2)}{\lambda \cdot r2 \cdot \phi 2} \right) \right]$$

where:
TE: Engine output torque
$\theta$: Pulley groove angle
$\mu$: Friction coefficient between V-belt and pulley
r: Running radius of V-belt
$\phi$: Contacting angle of V-belt with pulley groove
$\rho n$: Friction angle of frictional power transmission portion
$\lambda$: Shift characteristic value of V-belt.

If the P1 and P2 are calculated by putting certain appropriate values into the above equations (in this embodiment S2/S1=½), the result can be illustrated as shown by the two fully drawn curves in FIG. 3. As will be understood from FIG. 3, the curve P1 intersects with the curve P2 at a reduction ratio near one (1). Ideally, the line pressure should be slightly higher than the higher one of the two oil pressures P1 and P2 as shown by the broken line in FIG. 3.

Now, why the above mentioned ideal line pressure characteristic is obtained by the line pressure regulator valve 1102 is explained.

The line pressure generated by the line pressure regulator valve 1102 balances with the sum of the force with which the helical compression springs 1152 and 1154 bias the spool 1148 or pressure regulating element and the force derived from the throttle pressure in the port 1146b. The springs 1152 and 1154 act between the spool 1148 and the sleeve 1150 acted upon by the lever 1158. The lever 1158 has one end engaged with the sleeve 1150 and the other end engaged by the axially movable conical disc 1044 of the drive pulley 1006. The lever 1158 and the sleeve 1150 move toward the spool 1148 to decrease the length of springs 1152 and 1154 as the movable conical disc 1044 is moved to the left as viewed in FIG. 1 toward the largest reduction ratio. Thus, the length of the springs 1152 and 1154 is decreased as the reduction ratio increases or becomes large.

Figure 4:
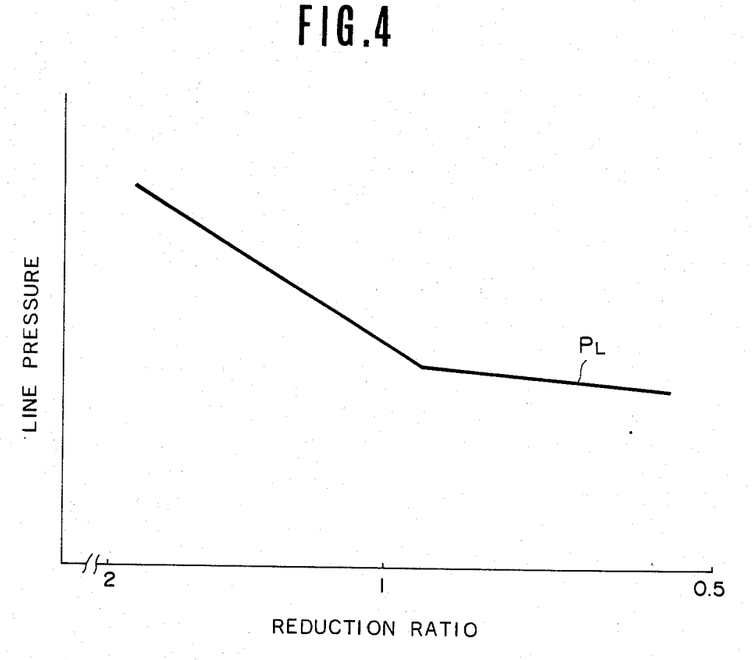
FIG. 4 shows a line pressure versus reduction ratio characteristic provided by a line pressure regulator valve shown in FIG. 2B.

When the reduction ratio is relatively small, the movable conical disc 1044 is displaced to the right as viewed in FIG. 2B to displace the lever 1158 counterclockwise, and thus the sleeve 1150 is displaced to the left as viewed in FIG. 2B. Under this condition, the spring 1154, which has a short free length as compared to the other spring 1152, a not compressed. Since under this condition the other spring 1152 acts on the spool 148 alone, the bias force applied to the spool 1148 under this condition is very small. Therefore, a rate of variation in the line pressure for a variation in the displacement of the sleeve 1150 (i.e., a change in reduction ratio) is small, too. However, the spring 1154 begins to be compressed after the sleeve 1150 has displaced to the right, as viewed in FIG. 2, beyond a predetermined length. The bias force under this condition is derived not only by the spring 1152 but also by the spring 1154. Thus, the bias force applied to the spool 1148 becomes great, and a rate of variation in the line pressure for a variation in the displacement of the sleeve 1150 increases. The characteristic of variation in the just described line pressure is illustrated by fully drawn bent line in FIG. 4 wherein the variation in the line pressure is illustrated versus a variation in the reduction ratio. That is, the variation in the line pressure is illustrated by the line as shown in FIG. 4 which is bent at one point. The gradient of the line on the smaller reduction ratio side is gradual, while that on the larger reduction ratio side is steep.

By selecting the length of the spring 1154 and the spring rate of each of the springs 1152 and 1154, the desired inflection point of the lines and their desired gradients are obtained. Therefore, the line pressure is given which takes or approximates to a sufficient degree the minimum value required.

Figure 5:
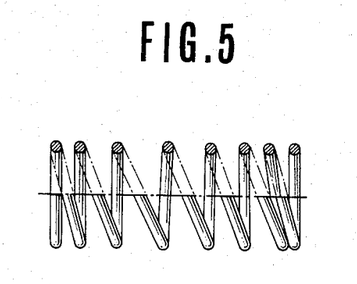
FIGS. 5, 6 and 7 show another forms of springs which may replace two springs used in the pressure regulator valve shown in FIG. 2B.
Figure 6:
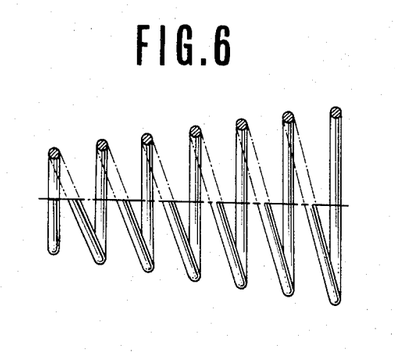
Figure 7:
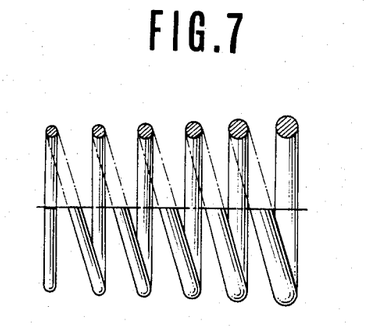
Figure 8:
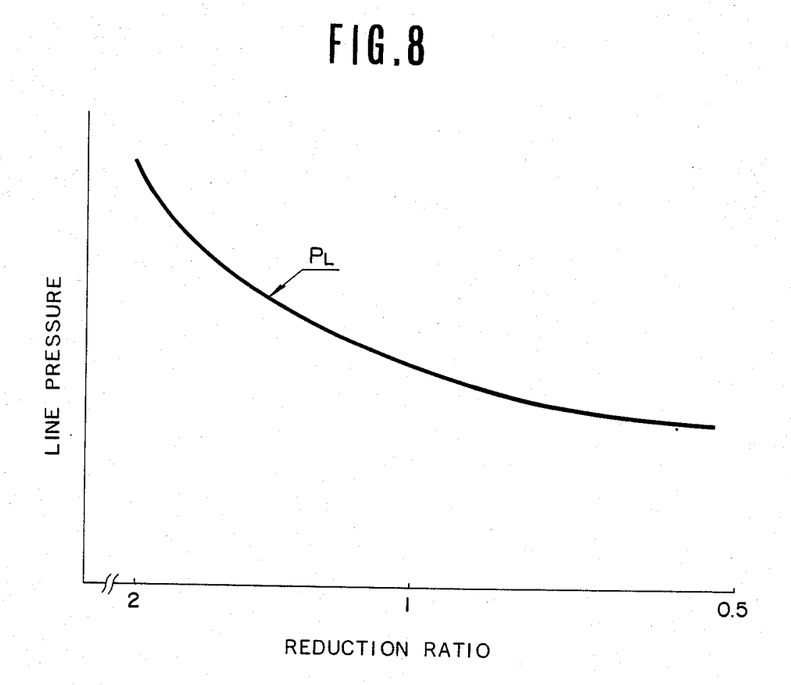
FIG. 8 shows a line pressure versus reduction ratio characteristic if any one of the springs shown in FIGS. 5, 6 and 7 is used.

Although, in the above embodiment, a plurality (two) of helical compression springs are used, they may be replaced with a non-uniform pitch helical compression spring as shown in FIG. 5, or a non-uniform coil diameter helical compression spring as shown in FIG. 6, or a non-uniform diameter helical compression spring as shown in FIG. 7. If one of the springs shown in FIGS. 5, 6 and 7 is used in the place of the two springs 1152, 1154, the non-liner line pressure characteristic as shown in FIG. 8 is obtained.

What is claimed is:

1. A hydraulic control system for controlling a continuously variable transmission having a V-belt connecting a drive and a driven pulley, the drive pulley having a first cylinder chamber and first and second conical discs, the driven pulley having a second cylinder chamber and third and fourth conical discs, the first conical disc being secured to a drive shaft, the third conical disc being secured to a driven shaft, the second conical disc being controllably movable in an axial direction with respect to the drive shaft in response to a fluid pressure in the first cylinder chamber, the fourth conical disc being controllably movable in an axial direction with respect to the driven shaft in response to a fluid pressure in the second cylinder chamber, the hydraulic control system comprising:

a source of hydraulic fluid pressure;
a line pressure regulator valve means for receiving and regulating said hydraulic fluid pressure and for generating a line pressure, said line pressure regulator valve means comprising a pressure regulating element having a pressure acting area exposed to said line pressure and being loaded by said line pressure in one direction, a member movable relative to said pressure regulating element, and spring means acting between said pressure regulating element and said member to bias said pressure regulating element in the opposite direction against said line pressure, said member being movable relative to said pressure regulating element to vary a length of said spring means, said spring means being constructed and arranged such that a force by which said spring means biases said pressure regulating element varies at a rate for a unit variation in said length thereof, which rate varies as said length varies, said pressure regulating element being movable in response to said force and said line pressure for effecting said regulation of said hydraulic fluid pressure thereby to generate said line pressure variable with said force;

a shift control valve means connected to said line pressure regulator valve means for receiving said line pressure and hydraulically controlling a reduction ratio between the drive and driven pulley; and means responsive to said reduction ratio between the drive and driven pulley for urging said member toward said pressure regulating element so as to decrease said length of said spring means as said reduction ratio increases.

2. A hydraulic control system as claimed in claim 1, wherein said pressure regulating element includes a spool.

3. A hydraulic control system as claimed in claim 1, wherein said spring means comprises a plurality of helical compression springs having different free lengths.

4. A hydraulic control system as claimed in claim 1, wherein said member urging means includes a pivoted lever having one end operatively engaged with and to be moved by the second conical disc of the drive pulley and an opposite end abuttingly seated against said member to move said member toward said pressure regulating element to decrease said length of said spring means as the said reduction ratio between the drive and driven pulleys increases.

5. A hydraulic control system as claimed in claim 4, wherein said line pressure regulator valve means communicates with the second cylinder chamber of the driven pulley to supply said line pressure thereto;

wherein said shift control valve means communicates with the first cylinder chamber of the drive pulley so as to regulate fluid supply to and fluid discharge from the first cylinder chamber, said shift control valve means including a spool movable to effect the fluid supply to and the fluid discharge from the first cylinder chamber; and wherein said member urging means includes a second lever having one end pivoted to said opposite end of said pivoted lever, an opposite end and an intermediate portion linked to said spool of said shift control valve means, and a shift actuator linked to said opposite end of said second lever.

6. A hydraulic control system as claimed in claim 1, wherein said spring means is in the form of a non-uniform pitch helical compression spring.

7. A hydarulic control system as claimed in claim 1, wherein said spring means is in the form of a non-uniform coil diameter helical compression spring.

8. A hydraulic control system as claimed in claim 1, wherein said spring means is in the form of a non-uniform wire diameter helical compression spring.

* * * * *